United States Patent
Wentink et al.

(10) Patent No.: US 9,392,469 B2
(45) Date of Patent: Jul. 12, 2016

(54) SYSTEMS AND METHODS FOR RECEIVER BASED CLEAR CHANNEL ASSESSMENT

(75) Inventors: Maarten Menzo Wentink, Breukelen (NL); Albert Van Zelst, Breukelen (NL)

(73) Assignee: QUALCOMM Incorporated, San Diego, CA (US)

(*) Notice: Subject to any disclaimer, the term of this patent is extended or adjusted under 35 U.S.C. 154(b) by 552 days.

(21) Appl. No.: 13/485,558

(22) Filed: May 31, 2012

(65) Prior Publication Data

US 2013/0142130 A1 Jun. 6, 2013

Related U.S. Application Data

(60) Provisional application No. 61/493,167, filed on Jun. 3, 2011.

(51) Int. Cl.
*H04W 76/02* (2009.01)
*H04W 24/02* (2009.01)
*H04W 28/26* (2009.01)

(52) U.S. Cl.
CPC .............. *H04W 24/02* (2013.01); *H04W 28/26* (2013.01); *H04W 76/02* (2013.01)

(58) Field of Classification Search
CPC ...... H04W 24/02; H04W 28/26; H04W 76/02
See application file for complete search history.

(56) References Cited

U.S. PATENT DOCUMENTS

| 6,240,083 | B1 * | 5/2001 | Wright | H04W 74/02 370/348 |
| 6,868,086 | B1 * | 3/2005 | Putzolu | H04L 12/46 370/395.53 |
| 6,876,326 | B2 | 4/2005 | Martorana | |
| 7,768,988 | B2 | 8/2010 | Li et al. | |
| 7,864,796 | B1 | 1/2011 | Benveniste | |
| 2003/0026241 | A1 * | 2/2003 | Ono | H04L 45/04 370/349 |
| 2003/0096631 | A1 * | 5/2003 | Kayama et al. | 455/522 |
| 2003/0161340 | A1 | 8/2003 | Sherman | |
| 2004/0090958 | A1 * | 5/2004 | Park | H04L 29/06 370/389 |
| 2005/0058151 | A1 | 3/2005 | Yeh | |
| 2005/0111423 | A1 | 5/2005 | Anderson et al. | |
| 2006/0183482 | A1 * | 8/2006 | Ueda | H04W 36/0061 455/439 |

(Continued)

FOREIGN PATENT DOCUMENTS

| EP | 0642283 A2 | 3/1995 |
| EP | 1635511 A1 | 3/2006 |

(Continued)

OTHER PUBLICATIONS

Ashtaiwi, "MIMO-Aware Medium Access Control in IEEE 802.11 Networks," Abduladhim Mabruk Ashtaiwi, Ph.D., Queen's University, Thesis, 2009, 175 pages.

(Continued)

*Primary Examiner* — Ajay Cattungal
(74) *Attorney, Agent, or Firm* — Kevin T. Cheatham

(57) ABSTRACT

Systems, methods, and devices for performing clear channel assessment at a receiving device are described herein. In some aspects, the receiving device determines whether it is the intended receiver for a data transmission. Upon determining it is the intended receiver, the receiving device transmits a reservation signal. Devices in the vicinity of the receiving device are configured to listen for the reservation signal and refrain from transmitting interfering signals to the receiving device based on the reservation signal.

28 Claims, 13 Drawing Sheets

(56) References Cited

U.S. PATENT DOCUMENTS

| | | | |
|---|---|---|---|
| 2006/0215779 A1* | 9/2006 | Shiina | H04L 27/2665 375/260 |
| 2007/0248063 A1* | 10/2007 | Habetha | H04L 5/1438 370/338 |
| 2009/0154382 A1* | 6/2009 | Park | H04L 69/32 370/310 |
| 2009/0233568 A1* | 9/2009 | Zhang | H04B 1/525 455/296 |
| 2009/0279524 A1* | 11/2009 | Yu | H04W 74/0833 370/338 |
| 2009/0310547 A1 | 12/2009 | Yokoyama | |
| 2010/0020770 A1 | 1/2010 | Qin et al. | |
| 2010/0046485 A1* | 2/2010 | Merlin et al. | 370/338 |
| 2010/0279709 A1* | 11/2010 | Shahidi | H04B 1/3805 455/456.2 |
| 2012/0257558 A1* | 10/2012 | Shin | H04W 52/0229 370/311 |
| 2013/0128809 A1* | 5/2013 | Wentink | H04L 29/0604 370/328 |

FOREIGN PATENT DOCUMENTS

| | | |
|---|---|---|
| EP | 2037718 A2 | 3/2009 |
| EP | 2051559 A2 | 4/2009 |
| JP | 2005117694 A | 4/2005 |
| JP | 2008503139 A | 1/2008 |
| JP | 2009510803 A | 3/2009 |
| WO | WO-2005125047 A1 | 12/2005 |
| WO | 2006133415 A2 | 12/2006 |
| WO | WO-2010021902 | 2/2010 |

OTHER PUBLICATIONS

International Search Report and Written Opinion—PCT/US2012/040600—ISA/EPO—Nov. 26, 2012.

Partial International Search Report—PCT/US2012/040600—ISA/EPO—Sep. 21, 2012.

European Search Report—EP14174721—Search Authority—The Hague—Oct. 23, 2014.

* cited by examiner

SYSTEMS AND METHODS FOR RECEIVER BASED CLEAR CHANNEL ASSESSMENT

CROSS REFERENCE TO RELATED APPLICATION(S)

This application claims the benefit of U.S. Provisional Application No. 61/493,167, filed Jun. 3, 2011, the entire content of which is incorporated herein by reference.

BACKGROUND

1. Field

The present application relates generally to wireless communications, and more specifically to systems, methods, and devices for receiver based clear channel assessment.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may communicate information between each other. As part of communicating, devices may make a determination whether a communication channel is available for communicating data in the geographic region the devices are communicating. Typically, a transmitting device will listen to see if it can detect any traffic on the communication channel it plans on using to transmit data to a receiving device as part of a clear channel assessment (CCA). If there is no traffic, the transmitting device determines the channel is clear in the area that the transmitting device plans to transmit, and therefore can communicate data to the receiving device. Such CCA performed at the transmitting device, however, can lead to issues where the transmitting device determines a channel is clear for transmitting to the receiving device when it is not, and also where the transmitting device determines a channel is not clear for transmitting to the receiving device when it is clear. Accordingly, systems, methods, and devices for improving CCA are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved CCA through the use of receiver based CCA.

One aspect of the disclosure provides a method of communicating in a wireless network. The method comprises receiving at least a portion of a data packet. The method further comprises determining that a wireless device is the intended receiver of the data packet. The method further comprises transmitting a reservation signal based on determining the wireless device is the intended receiver. The reservation signal is configured to reserve a communication channel for the wireless device to receive the data packet.

Another aspect of the disclosure provides a method of communicating in a wireless network. The method comprises listening for a reservation signal for at least a predefined period of time. The reservation signal is configured to reserve a communication channel. The method further comprises determining whether a reservation signal is detected. The method further comprises updating a channel access mechanism based on determination of detection of the reservation signal.

Another aspect of the disclosure provides a method of communicating in a wireless network. The method comprises listening for a reservation signal for at least a predefined period of time. The reservation signal is configured to reserve a communication channel. The method further comprises determining whether a reservation signal is detected. The method further comprises transmitting a data packet on the communication channel based on determination of detection of the reservation signal.

Another aspect of the disclosure provides an apparatus for communicating in a wireless network. The apparatus comprises a receiver configured to receive at least a portion of a data packet. The apparatus further comprises a processor configured to determine that the apparatus is the intended receiver of the data packet. The apparatus further comprises a transmitter configured to transmit a reservation signal based on determining the apparatus is the intended receiver. The reservation signal is configured to reserve a communication channel for the apparatus to receive the data packet.

Another aspect of the disclosure provides an apparatus for communicating in a wireless network. The apparatus comprises a receiver configured to listen for a reservation signal for at least a predefined period of time. The reservation signal is configured to reserve a communication channel. The apparatus further comprises a processor configured to determine whether a reservation signal is detected. The processor is further configured to update a channel access mechanism based on determination of detection of the reservation signal.

Another aspect of the disclosure provides an apparatus for communicating in a wireless network. The apparatus comprises a receiver configured to listen for a reservation signal for at least a predefined period of time. The reservation signal is configured to reserve a communication channel. The apparatus further comprises a processor configured to determine whether a reservation signal is detected. The apparatus further comprises a transmitter configured to transmit a data packet on the communication channel based on determination of detection of the reservation signal.

Another aspect of the disclosure provides an apparatus for communicating in a wireless network. The apparatus comprises means for receiving at least a portion of a data packet. The apparatus further comprises means for determining that the apparatus is the intended receiver of the data packet. The apparatus further comprises means for transmitting a reservation signal based on determining the apparatus is the intended receiver. The reservation signal is configured to reserve a communication channel for the apparatus to receive the data packet.

Another aspect of the disclosure provides an apparatus for communicating in a wireless network. The apparatus comprises means for listening for a reservation signal for at least a predefined period of time. The reservation signal is configured to reserve a communication channel. The apparatus further comprises means for determining whether a reservation signal is detected. The apparatus further comprises means for updating a channel access mechanism based on determination of detection of the reservation signal.

Another aspect of the disclosure provides an apparatus for communicating in a wireless network. The apparatus comprises means for listening for a reservation signal for at least a predefined period of time. The reservation signal is configured to reserve a communication channel. The apparatus further comprises means for determining whether a reservation signal is detected. The apparatus further comprises means for transmitting a data packet on the communication channel based on determination of detection of the reservation signal.

Another aspect of the disclosure provides a computer readable medium comprising instructions. The instructions when executed cause an apparatus to receive at least a portion of a data packet. The instructions when executed further cause the apparatus to determine that the apparatus is the intended receiver of the data packet. The instructions when executed further cause the apparatus to transmit a reservation signal based on determining the apparatus is the intended receiver. The reservation signal is configured to reserve a communication channel for the apparatus to receive the data packet.

Another aspect of the disclosure provides a computer readable medium comprising instructions. The instructions when executed cause an apparatus to listen for a reservation signal for at least a predefined period of time. The reservation signal is configured to reserve a communication channel. The instructions when executed further cause the apparatus to determine whether a reservation signal is detected. The instructions when executed further cause the apparatus to update a channel access mechanism based on determination of detection of the reservation signal.

Another aspect of the disclosure provides a computer readable medium comprising instructions. The instructions when executed cause an apparatus to listen for a reservation signal for at least a predefined period of time. The reservation signal is configured to reserve a communication channel. The instructions when executed further cause the apparatus to determine whether a reservation signal is detected. The instructions when executed further cause the apparatus to transmit a data packet on the communication channel based on determination of detection of the reservation signal.

DETAILED DESCRIPTION

Figure 1:
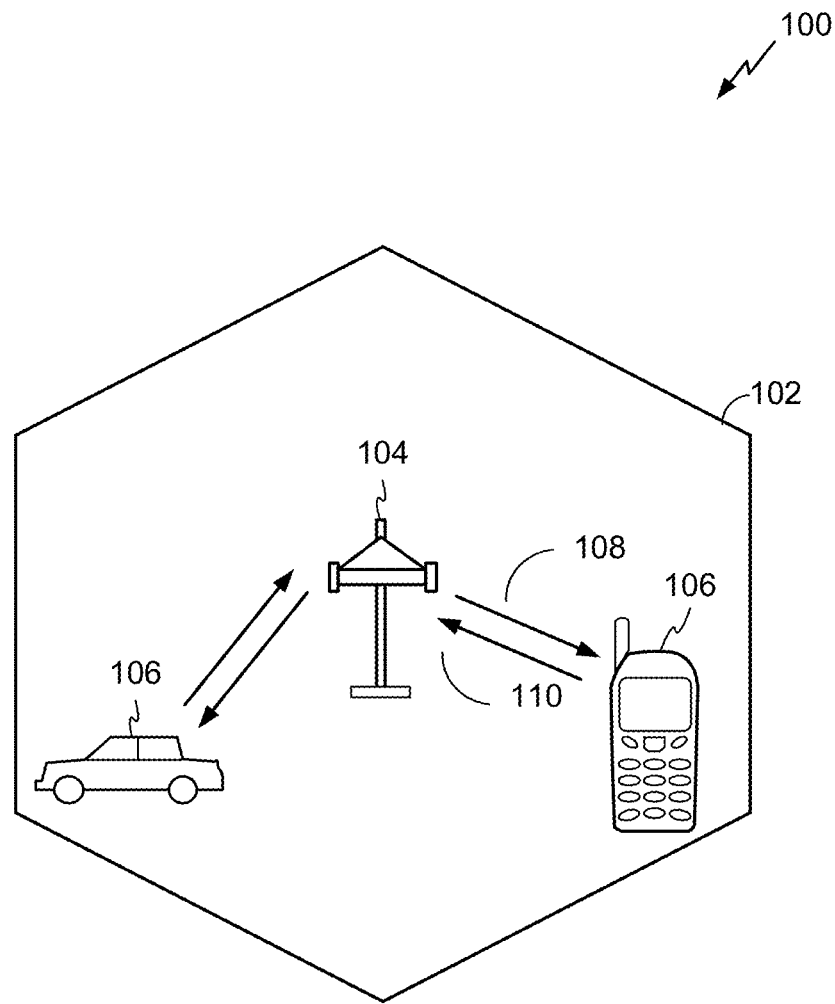
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAB"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106. Further, the functions of the STAs 106 described herein may alternatively be performed by one or more of the APs 104.

Figure 2:
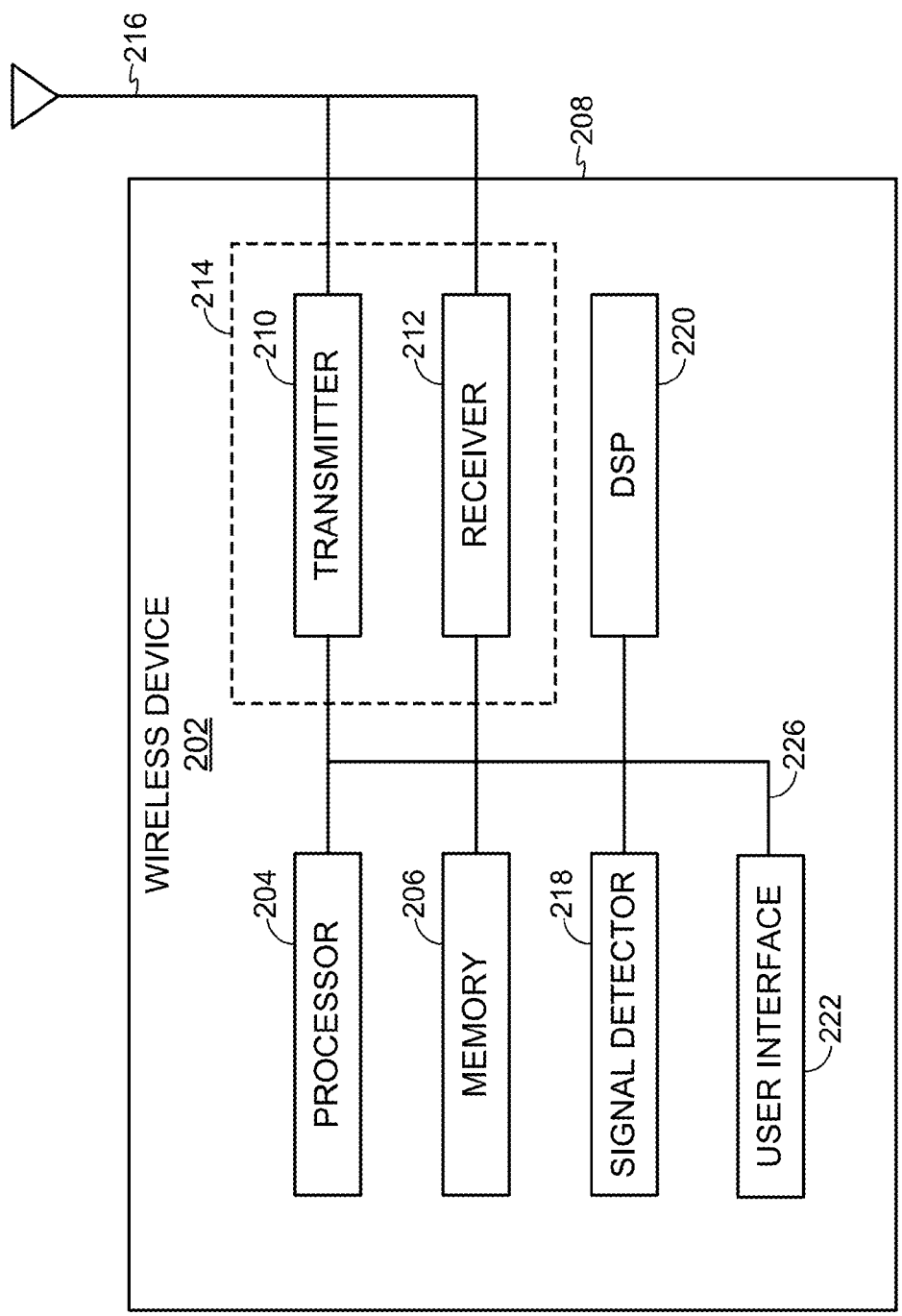
FIG. 2 illustrates various components, including a receiver, that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to generate data, process data, and control operation of the wireless device 202, as discussed in further detail below.

When the wireless device 202 is implemented or used as a receiving node, the processor 204 may be configured to generate data, process data, and control operation of the wireless device 202, as discussed in further detail below.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas. The transmitter 210 may be configured to wirelessly transmit data. The receiver 212 may be configured to receive data.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer convergence procedure (PLCP) protocol data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

As discussed above, the wireless device 202 may comprise an AP 104 or an STA 106, and may be used to transmit and/or receive data.

Described herein are systems and methods for performing clear channel assessment (CCA) to determine whether a communication channel is available for a transmitting node to transmit data to a receiving node. For example, the wireless device 202t may have data to send to the wireless device 202r. The wireless device 202t may be configured to communicate with the wireless device 202r on one or more channels. Before transmitting data, to the wireless device 202r, the wireless device 202t may perform a CCA to determine whether one or more channels are available for the communication with the wireless device 202r. Accordingly, the wireless device 202t may listen to one or more channels and determine whether or not the one or more channels are being used by other devices. If the wireless device 202t detects energy (e.g., transmissions) on the one or more channels, the wireless device 202t determines that the one or more channels are in use and that if the wireless device 202t transmits data on those one or more channels to the wireless device 202r, it will cause interference. If the wireless device 202t does not detect energy, the wireless device 202t can transmit the data to the wireless device 202r.

Therefore, the above described CCA is based on whether there are transmissions near the wireless device 202t that would interfere with communications with the wireless device 202r as opposed to being based on whether there are transmissions near the wireless device 202r that would interfere with communications. However, it is the wireless device 202r that needs to receive the data from the wireless device 202t, while avoiding transmissions from other devices, in order to avoid interference. Accordingly, transmitter based CCA can lead to detection of potential interferers for communication with the wireless device 202r in areas that would not interfere with reception by the wireless device 202r. Further, transmitter based CCA may not detect potential interferers in areas that would interfere with reception by the wireless device 202r. This issue is discussed further with respect to FIG. 3.

Figure 3:
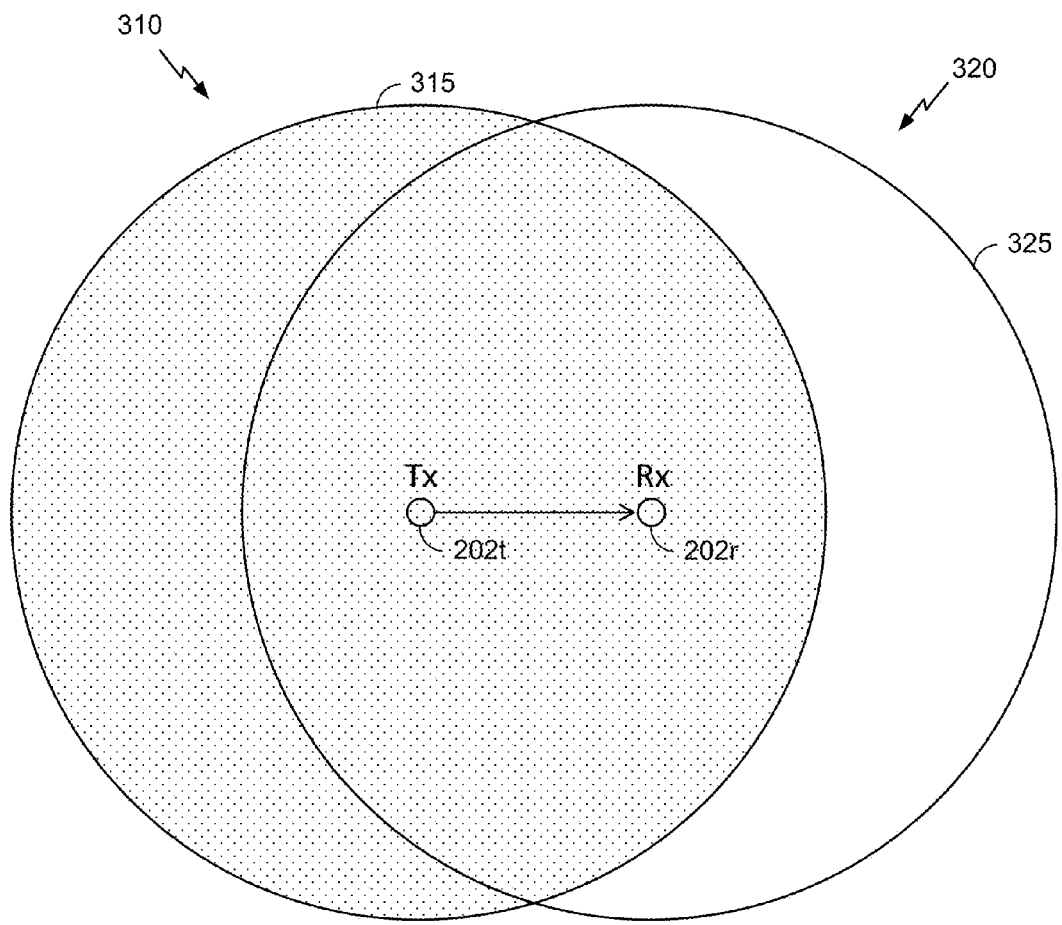
FIG. 3 illustrates the geographic areas within which wireless devices are able to transmit and receive communications.

FIG. 3 illustrates the geographic areas within which wireless devices are able to transmit and receive communications. As shown, the wireless device 202t is transmitting data to the wireless device 202r. The area 310 (represented by a circle, though the actual geographic area may not be a circle) surrounding the wireless device 202t indicates the area in which transmissions from the wireless device 202t are detectable by another wireless device. Further, the area 310 represents the area where if transmitting wireless devices are located, the wireless device 202t can detect the transmission of those transmitting wireless devices. The area 320 (represented by a circle, though the actual geographic area may not be a circle) surrounding the wireless device 202r indicates the area in which transmissions from the wireless device 202r are detectable by another wireless device. Further, the area 320 represents the area where if transmitting wireless devices are located, the wireless device 202r can detect the transmission of those transmitting wireless devices. Accordingly, for the wireless device 202r to receive transmissions from the wireless device 202t without interference, there should not be transmissions occurring from other devices in the area 320. However, transmitter based CCA only allows the wireless device 202t to detect transmissions from other devices in the area 310. Accordingly, the wireless device 202t may detect transmissions in the area 315 (the area of the circle 310 that does not intersect with the area of the circle 320) and not transmit to the wireless device 202r, even though the transmission would be acceptable for such a scenario. Further, the wireless device 202t would not detect transmissions in the area 325 (the area of the circle 320 that does not intersect with the area of the circle 310) and may transmit to the wireless device 202r, even though such transmission could have potential interference from other transmitting devices in the area 325. Accordingly, the systems and methods discussed herein allow for receiver based CCA, meaning the determination for whether there are interfering signals is made by the wireless device 202r, which can accurately detect interfering signals in the appropriate area 320.

In one embodiment, the wireless device 202r can ensure that other transmitters in the area 320 do not transmit on the same channel or channels at the same time as the wireless device 202t is transmitting, and therefore can avoid interference, by setting a network allocation vector (NAV) in the area 320. The NAV reserves the channel or channels for a set duration of time for the wireless device 202t and the wireless device 202r, and therefore other devices will not transmit during the NAV. The NAV may be configured using request to send/clear to send (RTS/CTS) messaging between the wireless device 202t and the wireless device 202r.

Figure 4:
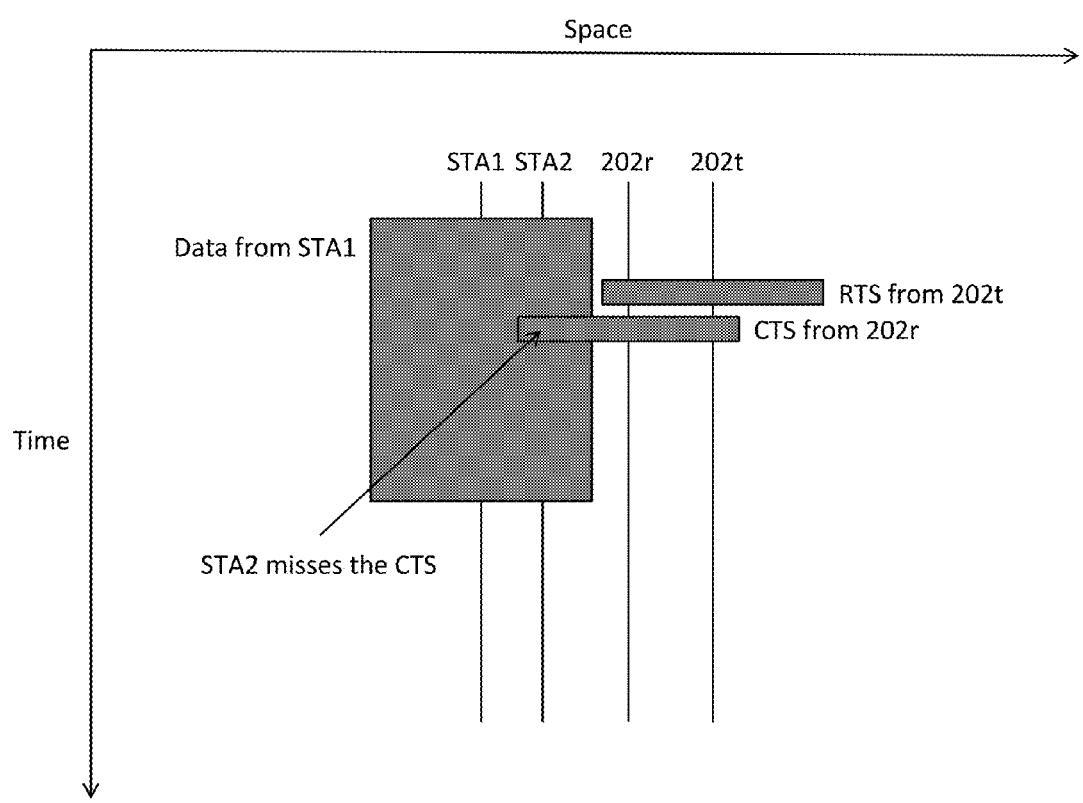
FIG. 4 illustrates an example of the signaling that may occur for setting a network allocation vector (NAV).

FIG. 4 illustrates an example of the signaling that may occur for setting a NAV. As shown, the wireless device 202t may transmit data requesting a NAV for a particular duration to the wireless device 202r, so that the wireless device 202t may transmit data to the wireless device 202r during the NAV. This request may be referred to as a request to send (RTS). The wireless device 202r may receive the request and determine whether any potential interferers are transmitting in the area 320 by listening for transmissions. If no potential interferers are identified, the wireless device 202r may transmit data to the wireless device 202t indicating the communication channel is available for transmission. The indication may be referred to as a clear to send (CTS). The indication is transmitted in the area 320 since it is transmitted by the wireless device 202r. Devices (e.g., STA2) in the area 320 that receive (hear) the indication then refrain from transmitting for the NAV, thereby stopping interference in the area 320. An issue may arise, however, where a device (e.g., STA2) in the area 320 does not hear the indication, and therefore does not refrain from transmitting. This can occur where the device in the area 320 is already communicating (transmitting and/or receiving data (e.g., STA2 receiving data from STA 1)) when the wireless device 202r transmits the indication. Accordingly, there may be interference at the wireless device 202r when the wireless device 202t transmits data to the wireless device 202r.

In another embodiment, the wireless device 202r may be configured to transmit a reservation signal (which may be referred to as a "beep") on one or more dedicated channels (which may be referred to as "CCA bands") that are not used for data communication by the wireless devices in the network in order to reserve one or more communication channels (which may be referred to as "data bands"). The dedicated channels may be, for example, a dedicated narrow band channel (or channels) with center frequency (or frequencies) that are not within the one or more channels used for data communication by the devices. There may be some separation between the frequency band(s) used for the one or more dedicated channels and the frequency band(s) used for the one or more communication channels. Further, each different dedicated channel may be associated with one or more different communication channels. Thus, depending on the communication channel or channels the wireless device 202r wants to reserve for communication, the wireless device 202r may transmit one or more reservation signals on the appropriate dedicated channel(s). The wireless device 202r may be configured to transmit the reservation signal for as long as the wireless device 202r intends to reserve the one or more communication channels. Accordingly, when the wireless device 202r determines it is going to receive data from the wireless device 202t over one or more communication channels, the wireless device 202r begins transmitting the reservation signal on the appropriate dedicated channel.

The wireless device 202r may determine it is going to receive data from the wireless device 202t by receiving an initial portion of a data packet transmitted from the wireless device 202t. The initial portion of the data packet may include header information that indicates to the wireless device 202r that it is the intended recipient of the data packet. Once it makes this determination, the wireless device 202r may start transmitting the reservation signal on the appropriate dedicated channel. The time between the wireless device 202r receiving the initial portion of the data packet and beginning transmission of the reservation signal may be referred to as the time to beep or (TTB). Therefore, the wireless device 202r can receive the remainder of the data packet from the wireless device 202t without interference from other devices. The time it takes for the wireless device 202r to make this determination as to whether it is the intended recipient may be reduced by the wireless device 202t including the media access control (MAC) address of the wireless device 202r in the preamble of the data packet. For example, the MAC address of the wireless device 202r may be included in the physical layer (PHY) header of the packet. The wireless device 202r can then detect the MAC address early in the transmission of the data packet and determine it is the recipient based on the detection.

Before a device transmits data on a communication channel, it may be configured to listen on the dedicated channel associated with the communication channel to determine if a reservation signal is received. If a reservation signal is received, the transmitting device determines the wireless device 202r has reserved the communication channel and refrains from transmitting, thus avoiding interference. The period that a device listens for a reservation signal may be a long point coordination function inter-frame space (PIFS). The PIFS may be set to at least cover the time between when a receiver detects a packet and when it determines it is the recipient of the packet. Therefore, the device will not begin transmitting right away to avoid the situation where the wireless device 202r has begun receiving a packet, but not yet transmitted a reservation signal because it has not yet determined it is the recipient of the data packet. If the transmitting device does not hear a reservation signal within the long PIFS, it assumes the communication channel is idle and begins transmitting data as discussed below with respect to FIG. 5.

Figure 5:
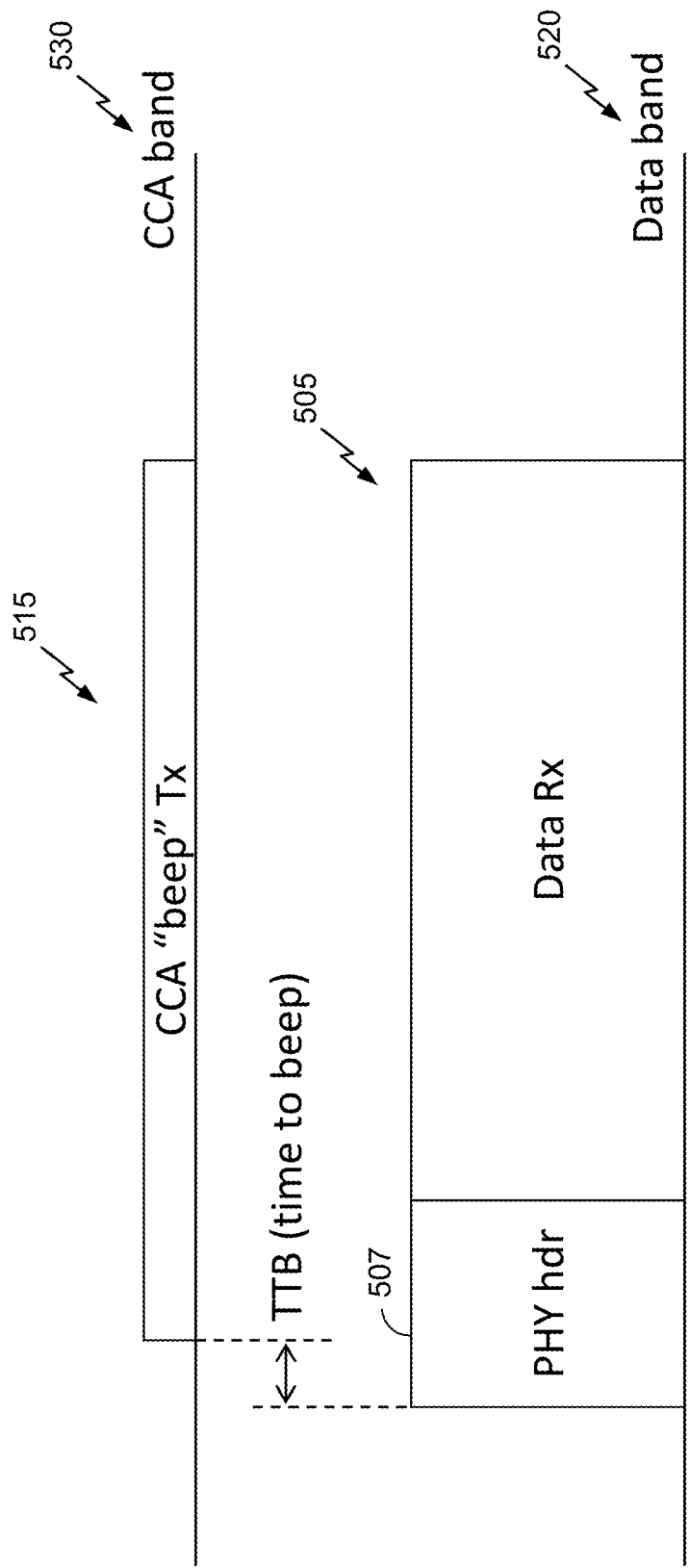
FIG. 5 illustrates an example of the signaling that may occur for transmitting a reservation signal.

FIG. 5 illustrates an example of the signaling that may occur for transmitting a reservation signal. As shown, a data packet 505 is transmitted from the wireless device 202t to the wireless device 202r over a data band 520. After the wireless device 202r receives the first portion of the data packet 505, in this case part of the PHY header 507, starting at time 0, it determines it is the intended receiver. The wireless device 202r then transmits a beep 515 over a CCA band 530 associated with the data band 520 after a period of a TTB. The wireless device 202r continues to transmit the beep 515 over the CCA band 530 as it receives the data packet 505 over the data band 520, thereby reserving the data band 520.

Set forth below are factors for consideration when implementing the method of using a reservation signal described above in a wireless network. In one embodiment, the slot time for data transmissions in the network is set to at least equal the TTB. Further, the PIFS may be set to short inter-frame spacing (SIFS)+slot time. In some embodiments, in addition to or alternative to the receiver (e.g., wireless device 202r) transmitting the reservation signal to reserve one or more communication channels, the transmitter (wireless device 202t) can also transmit the reservation signal to reserve the one or more communication channels. Further, in some embodiments, the wireless device 202t may transmit the reservation signal to reserve the one or more communication channels in anticipation of receiving an acknowledgement (ACK) from the wireless device 202r based on transmission of the data packet. The wireless device 202t may transmit the reservation signal until it receives the ACK. In one embodiment, the wireless device 202t may transmit the reservation signal after it transmits the data packet until it receives the ACK. In another embodiment, the wireless device 202t may transmit the reservation signal as soon as it starts transmitting the data packet until it receives the ACK, which may help further avoid interference while the initial portion of the packet is transmitted to the wireless device 202r by the wireless device 202t.

Figure 6:
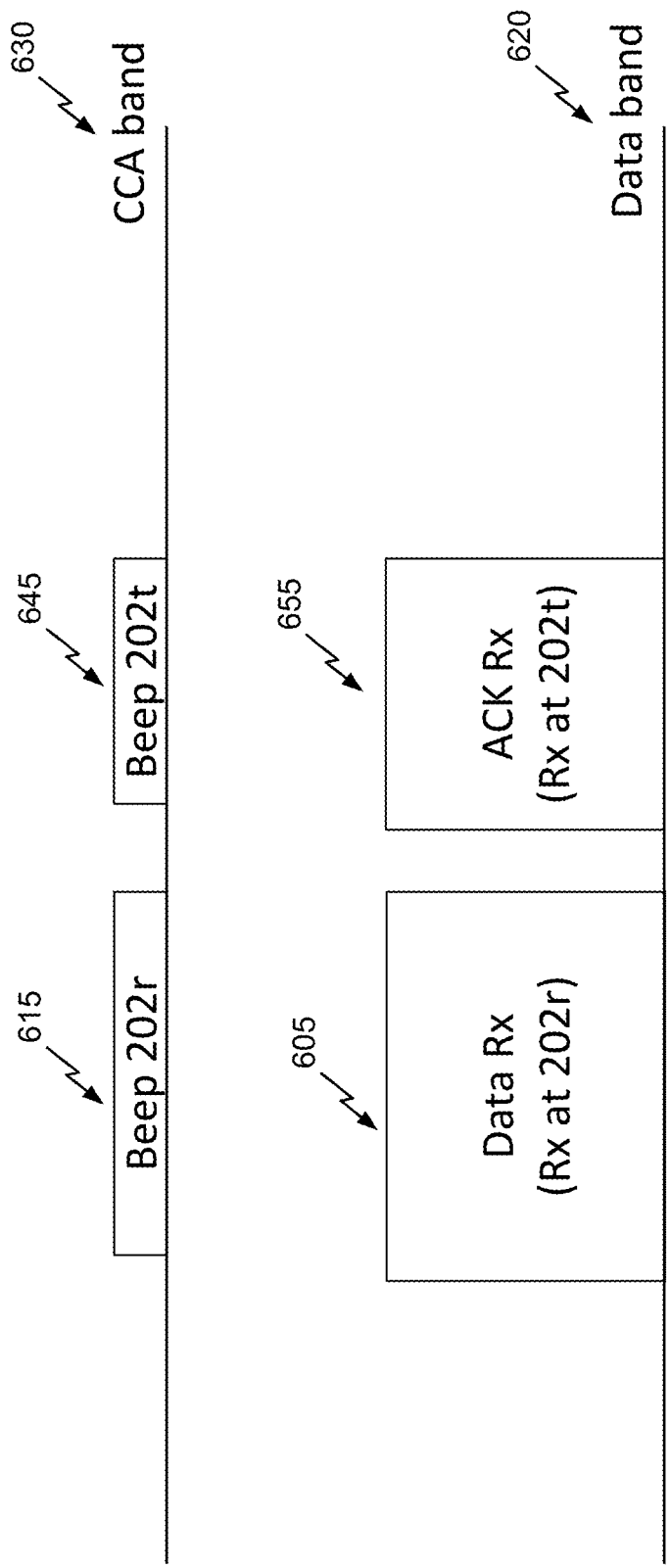
FIG. 6 illustrates an example of transmission of a reservation signal by a transmitting device and a receiving device to reserve a data band.

FIG. 6 illustrates an example of transmission of a reservation signal by a transmitting device and a receiving device to reserve a data band. Similar to FIG. 5, a data packet 605 is transmitted from the wireless device 202t to the wireless device 202r over a data band 620. Further, the wireless device 202r transmits a beep 615 over a CCA band 630 as it receives the data packet 605 over the data band 620, thereby reserving the data band 620. In addition, the wireless device 202t transmits a beep 645 over the CCA band 630, while the wireless device 202r transmits an ACK 655 over the data band 620 to the wireless device 202t. Accordingly, the wireless device 202t reserves the data band 620 to receive the ACK 655 from the wireless device 202r.

Figure 7:
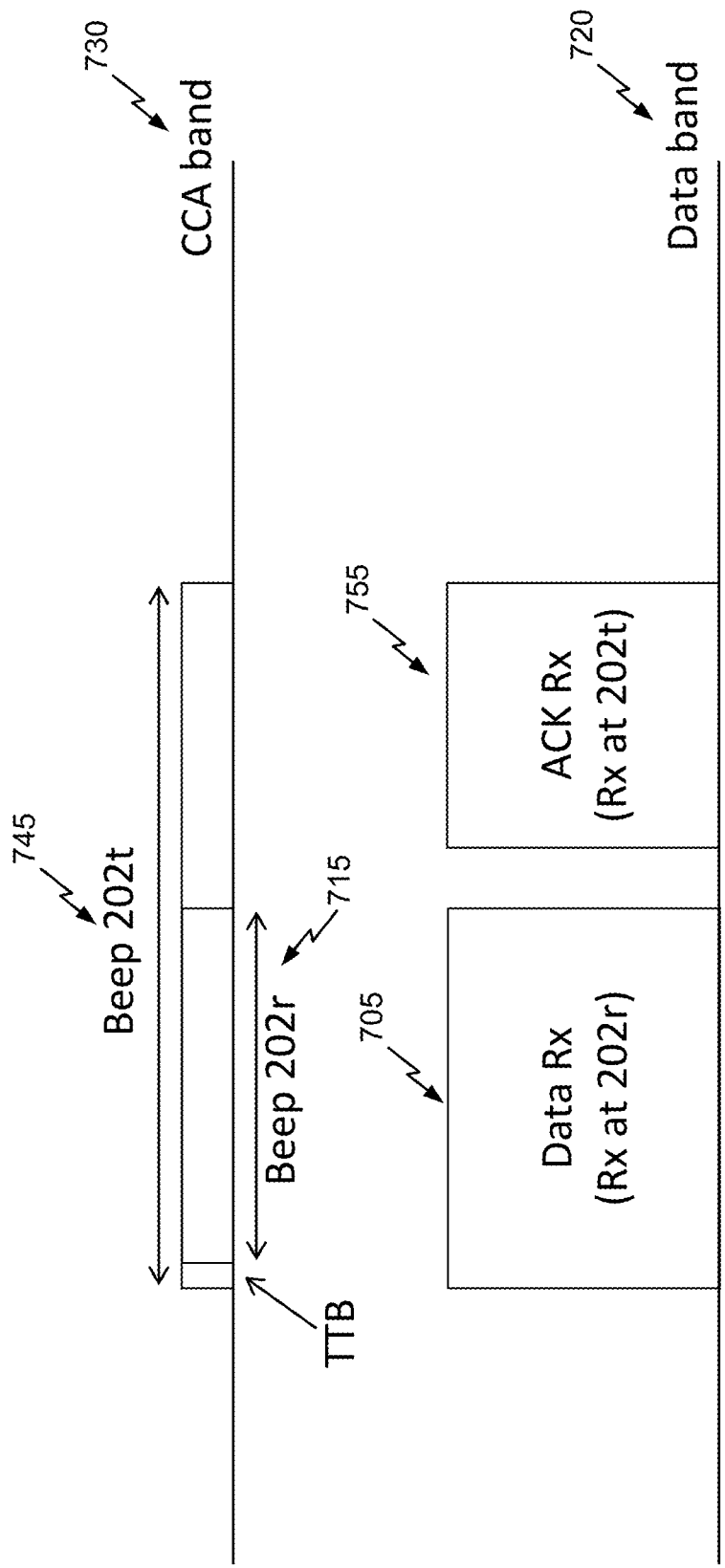
FIG. 7 illustrates another example of transmission of a reservation signal by a transmitting device and a receiving device to reserve a data band.

FIG. 7 illustrates another example of transmission of a reservation signal by a transmitting device and a receiving device to reserve a data band. Similar to FIG. 6, a data packet 705 is transmitted from the wireless device 202t to the wireless device 202r over a data band 720. Further, the wireless device 202r transmits a beep 715 over a CCA band 730 as it receives the data packet 705 over the data band 720, thereby reserving the data band 720. In addition, the wireless device 202t transmits a beep 745 over the CCA band 730 both while it transmits the data packet 705, and while the wireless device 202r transmits an ACK 755 over the data band 720 to the wireless device 202t. Accordingly, the wireless device 202t reserves the data band 720 to transmit the data packet 705 and receive the ACK 755 from the wireless device 202r.

In another embodiment, the receiver of data (e.g., the wireless device 202r) may be configured to transmit a different type of reservation signal that comprises a short beep (which may be referred to as a receiver beep (RxBeep)) that reserves one or more communication channels for a period of time that may be referred to as a beep interval (BI). The BI may be a fixed value. The wireless device 202r may be configured to transmit the RxBeep on the same one or more communication channels on which the wireless device 202r intends to receive data from the wireless device 202t.

In one embodiment, the RxBeep comprises some short training fields along with some data superimposed on the short training fields. In general, the RxBeep may be some signal that wireless devices are configured to recognize as uniquely defining an RxBeep. Accordingly, when the wireless device 202r transmits an RxBeep on one or more channels, other devices in the area 320 will hear the RxBeep on the one or more channels. Upon hearing the RxBeep in the area 320, the other devices refrain from transmitting for the BI on the one or more channels. The wireless device 202r may be configured to ignore its own RxBeep. Further, the wireless device 202t need not listen for RxBeeps during the time the wireless device 202r is transmitting the RxBeep reserving the channel(s) the wireless device 202t is going to transmit on. Wireless device 202t may halt its transmission during the RxBeeps.

Therefore, in order to ensure that there is not interference at the wireless device 202r when the wireless device 202t is transmitting to the wireless device 202r over one or more channels, the wireless device 202r may transmit the RxBeep. The RxBeep reserves the one or more channels for transmissions by the wireless device 202t during a BI after transmission of the RxBeep, referred to as a reserved BI. The wireless device 202r may transmit the RxBeep just after it determines it is the intended recipient of data. The wireless device 202t may then be configured to transmit to the wireless device 202r during the reserved BI. The wireless device 202r may be configured to transmit multiple RxBeeps periodically to reserve multiple BIs when it determines it is the intended recipient of data based on a determination made by the wireless device 202r of the amount of data that it intends to receive from the wireless device 202t. The number of BIs reserved may be based on the amount of data the wireless device 202t receives.

The wireless device 202r may determine it is going to receive data from the wireless device 202t by receiving an initial portion of a data packet transmitted from the wireless device 202t. The initial portion of the data packet may include header information that indicates to the wireless device 202r that it is the intended recipient of the data packet. The time it takes for the wireless device 202r to make this determination after receiving the initial portion of the packet may be referred to as the time to first beep (TTFB). The name is appropriate as the wireless device 202r may transmit an RxBeep as soon as the determination is made that it is the intended recipient of the data packet. The TTFB may be reduced by the wireless device 202t including the media access control (MAC) address of the wireless device 202r in the preamble of the data packet. The wireless device 202r can then detect the MAC address early in the transmission of the data packet and determine it is the recipient based on the detection. The wireless device 202r may further determine whether to send additional RxBeeps at other times after the first reserved BI to reserve additional BIs based on an indication in the initial portion of the data packet that indicates the amount of data being transmitted to the wireless device 202r by the wireless device 202t.

Figure 8:
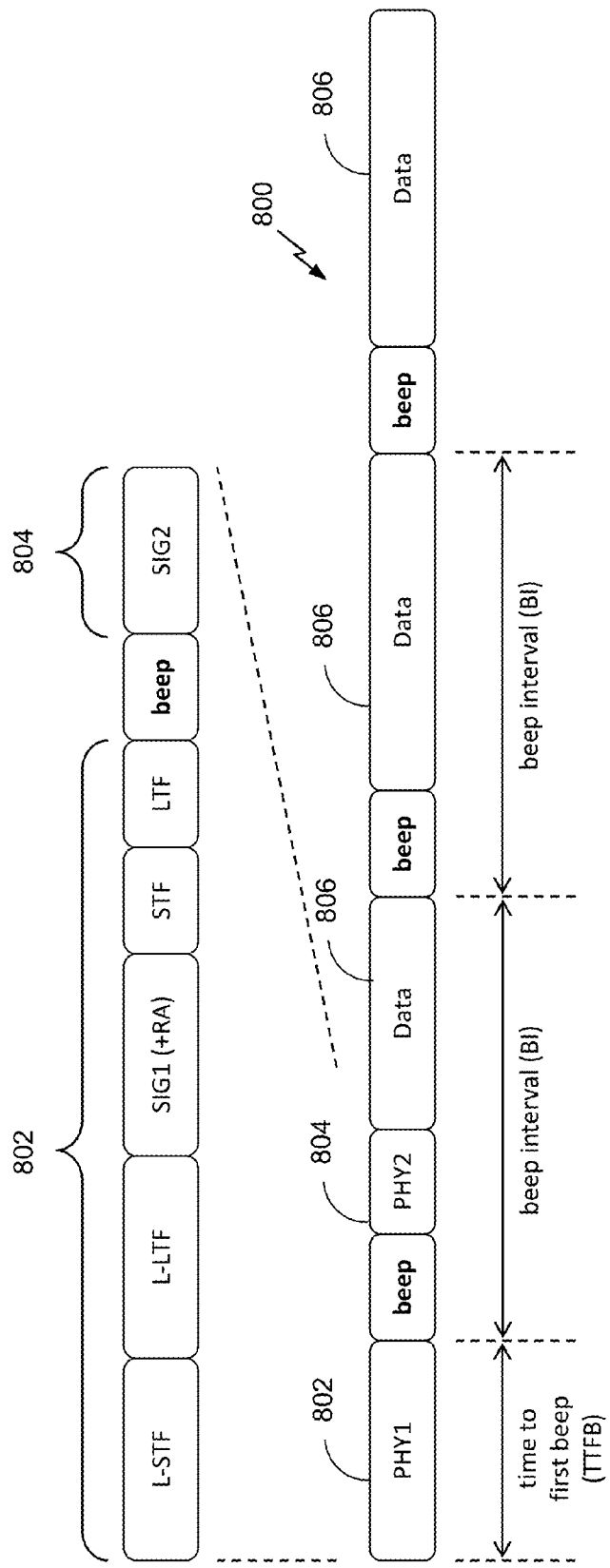
FIG. 8 illustrates the transmission of reservation signals by a wireless device receiving a packet.

FIG. 8 illustrates the transmission of RxBeeps by a wireless device 202r receiving a packet 800. The packet 800 as illustrated includes several fields, including a PHY1 field 802 with header information, a PHY2 field 804 with header information, and several data fields 806. The wireless device 202r receiving the data packet 800 may be configured to make a determination as to whether it is the intended receiver of the data packet 800 based on information contained in the PHY1 field 802. Accordingly, the wireless device 202r may be configured to transmit an RxBeep after receipt of the PHY1 field 802, the time period corresponding to a TTFB. The RxBeep reserves the communication channel over which the data packet 800 is being received for a first BI. The wireless device 202r may further determine that it will take 3 BI to receive the data packet 800 based on the information contained in the PHY1 field 802. Accordingly, after the first BI, the wireless device 202r may transmit another RxBeep to reserve the channel for a second BI. Additionally, after the second BI, the wireless device 202r may transmit another RxBeep to reserve the channel for a third BI. Accordingly, the entire data packet 800 is received during reserved BIs. The wireless device 202r may also keep transmitting RxBeeps at each BI as long as the reception of data packet 800 has not ended.

Before a potential transmitting device like the wireless device 202t begins transmitting data, it listens for an RxBeep. The potential transmitting device may listen for the RxBeep for a PIFS. The PIFS may be set to be at least the length of a BI as this ensures that the potential transmitting device did not miss an RxBeep that may have reserved a BI right before the potential transmitting device started listening for an RxBeep. Based on receipt of an RxBeep, various channel access mechanisms may be updated by the wireless device 202t (e.g., PIFS, SIFS, AIFS, slot time, etc.). For example, the slot time for communications may be set to at least the TTFB plus the short inter-frame spacing (SIFS). Further, the arbitration inter-frame spacing (AIFS) for communications may be set to PIFS+(AIFS number (AIFSN)−1)*slot time. The slot time, PIFS, SIFS, AIFS, etc. may be configured as part of the physical layer (PHY) and media access control (MAC) layer used for communications in the wireless network as is known in the art. If the potential transmitting device hears an RxBeep within the PIFS it does not transmit for a BI and it maintains the channel busy for a BI with respect to its channel access function. If the potential transmitting device does not hear an Rx Beep within the PIFS, it determines the channel(s) is clear to use for communication or for decrementing of its backoff counter.

Set forth below are factors for selecting an appropriate value for the BI. To make this selection, several considerations may be taken into account. For example, an RxBeep may add about 4 μs of overhead per BI, making a longer BI better as fewer RxBeeps need to be sent to reserve time. However, PIFS is increased by having a longer BI, making a shorter BI better as devices do not have to listen as long to determine whether a communication channel is free. Further, a long slot time increases the overhead for reserving a communication channel, as the slot time is related to the TTFB, which should be as short as possible. Therefore, examples of different values for TTFB, BI, slot time, etc. are discussed below to show how values can be adjusted to decrease overhead for reserving communication channels.

In one example, TTFB=28 μs, BI=80 μs, and SIFS=16 μs. Accordingly, PIFS=BI=80 μs. Further, slot time=TTFB+SIFS=44 μs. Additionally, distributed coordination function (DCF) inter-frame space (DIFS)=PIFS+slot time=124 μs. Thus, the average time that is required to wait before a potential transmitter transmits traffic is DIFS+7.5*slot time=454 μs. Further, for a 2 ms long packet, 26 beeps would need to be sent to reserve the time, requiring about 102 μs to transmit beeps. Therefore, the total overhead to transmit a 2 ms long packet is 454+102=556 μs, which is about 22% of the overall 2 ms packet.

In another example, TTFB=20 μs, BI=80 μs, and SIFS=10 μs. Accordingly, DIFS=BI=80 μs (where there is not PIFS access in the system). Further, slot time=TTFB+SIFS=30 μs. Thus, the average time that is required to wait before a potential transmitter transmits traffic is DIFS+7.5*slot time=305 μs. Further, for a 2 ms long packet, 26 beeps would need to be sent to reserve the time, requiring about 103 μs to transmit beeps. Therefore, the total overhead to transmit a 2 ms long packet is 305+103=408 μs, which is about 17% of the overall 2 ms packet.

Figure 9:
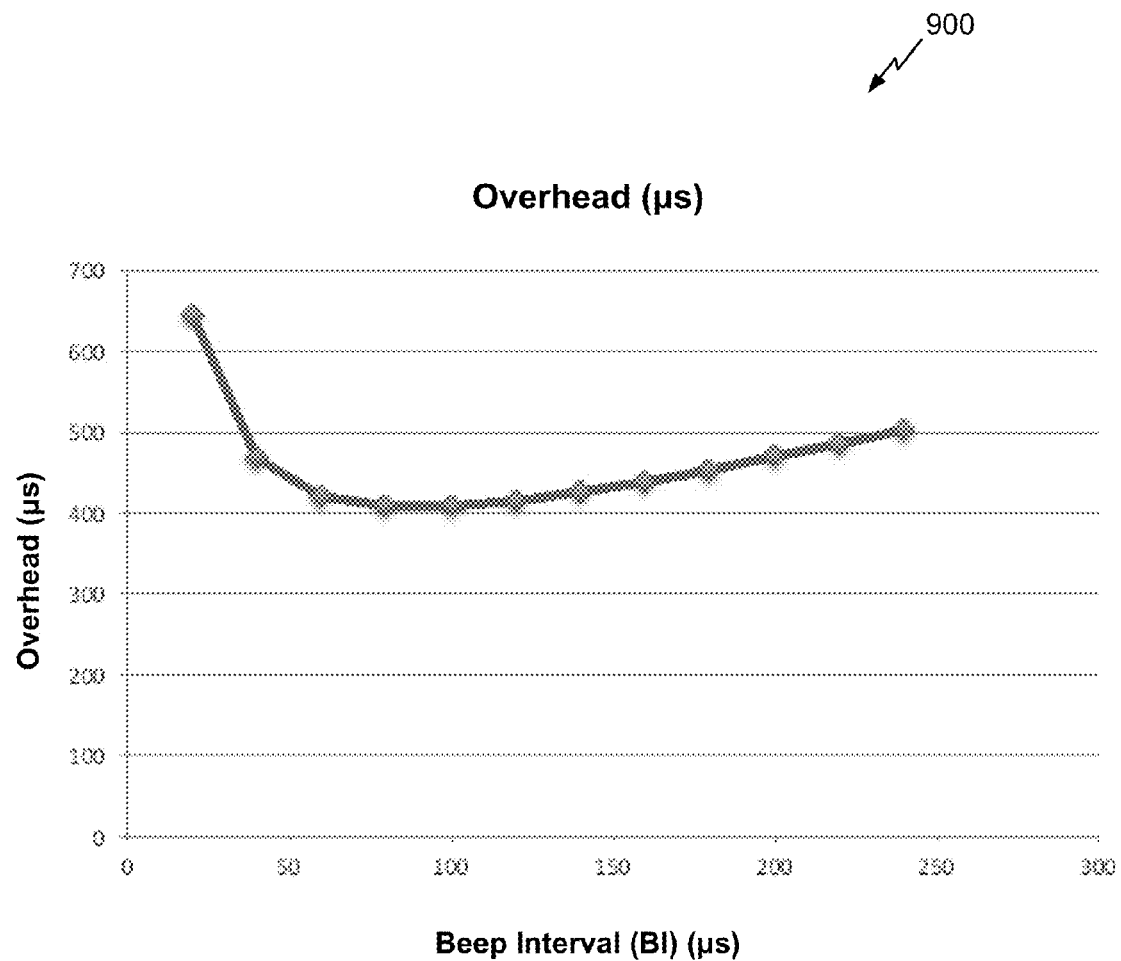
FIG. 9 illustrates a graph of the amount of time spent in overhead for reserving communications channels versus the value chosen for a beep interval (BI).

FIG. 9 illustrates a graph of the amount of time spent in overhead for reserving communications channels versus the value chosen for BI. The graph 900 is based on simulations done for a particular network, similar to the examples discussed above. As seen, it appears that a BI of around 100 μs leads to the lowest overhead (about 400 μs) for reserving communication channels.

In some embodiments, RxBeep may also be used to perform collision detection, similar to RTS/CTS. In such embodiments, the wireless device 202t that has data to transmit to the wireless device 202r may be configured to wait to receive the beep from the wireless device 202r before transmission (meaning it needs to have circuitry activated to receive the beep). The wireless device 202t may then transmit a response beep (a TxBeep). This may reduce the time required to detect a collision.

It should also be noted that TxBeeps can be used in addition to or alternative to RxBeeps to reserve communication channels. The RxBeeps and TxBeeps may be scheduled in subsequent symbols.

Figure 10:
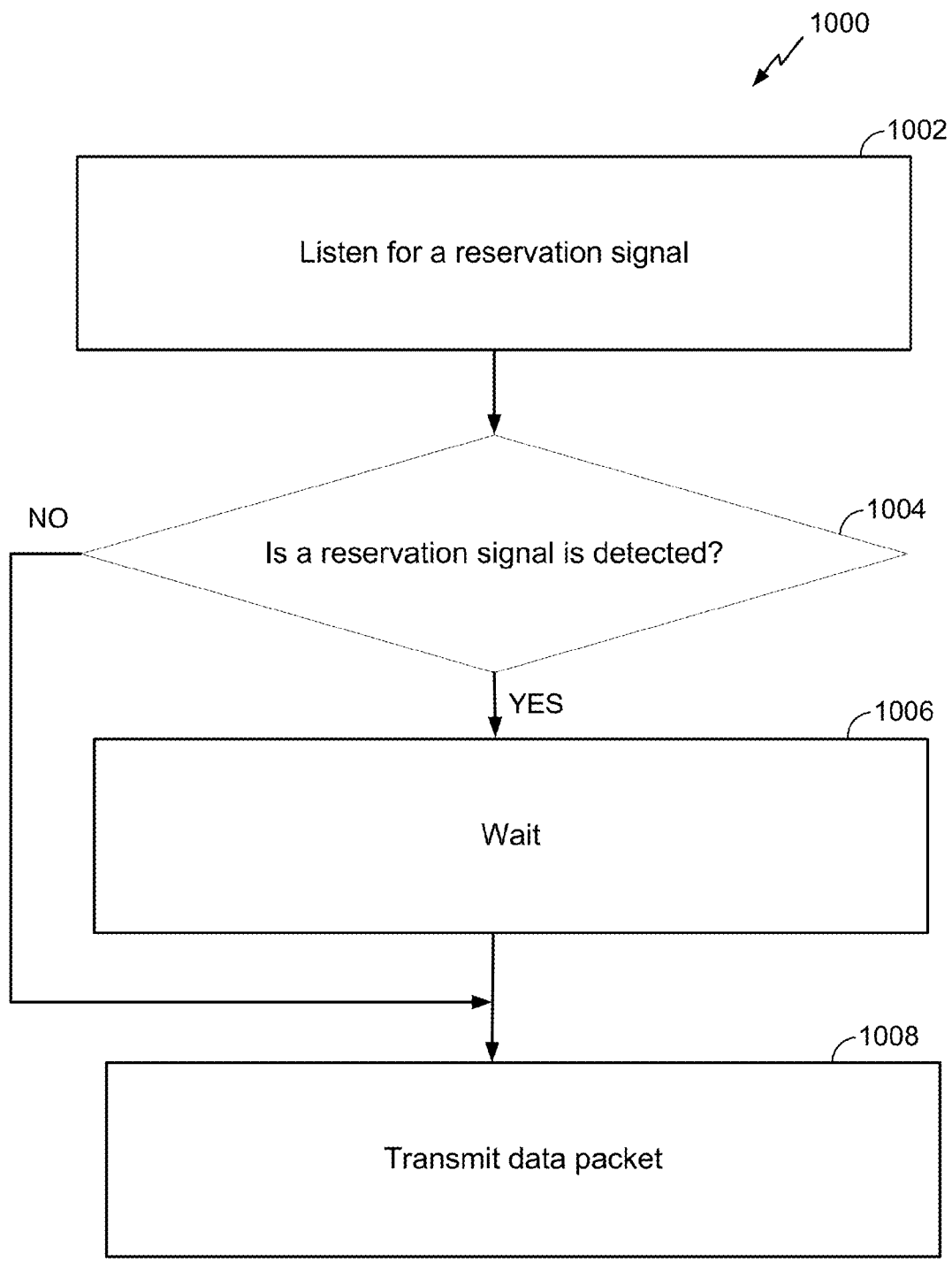
FIG. 10 illustrates an aspect of a method for transmitting data in a wireless network using receiver based clear channel assessment (CCA).

FIG. 10 illustrates an aspect of a method 1000 for transmitting data in a wireless network using receiver based CCA. At a block 1002, the wireless device 202t listens for a reservation signal indicating that one or more communications channels the wireless device 202t wants to transmit data is in use. The wireless device 202t may listen on one or more dedicated channels associated with the one or more channels, or on the one or more channels themselves based on the type of reservation signal used as discussed above. The wireless device 202t may further listen for a predetermined period of time. At a block 1004, the wireless device 202t determines if a reservation signal is detected. If at the block 1004, a reservation signal is detected, the wireless device 202t waits at a block 1006. The wireless device 202t may wait until the reservation signal is no longer detected, or for a fixed time period based on the type of reservation signal detected as discussed above. The method 1000 then continues to a block 1008. If at the block 1004, a reservation signal is not detected, the wireless device 202t continues to the block 1008. At the block 1008, the wireless device 202t begins transmitting a data packet to the wireless device 202r.

Figure 11:
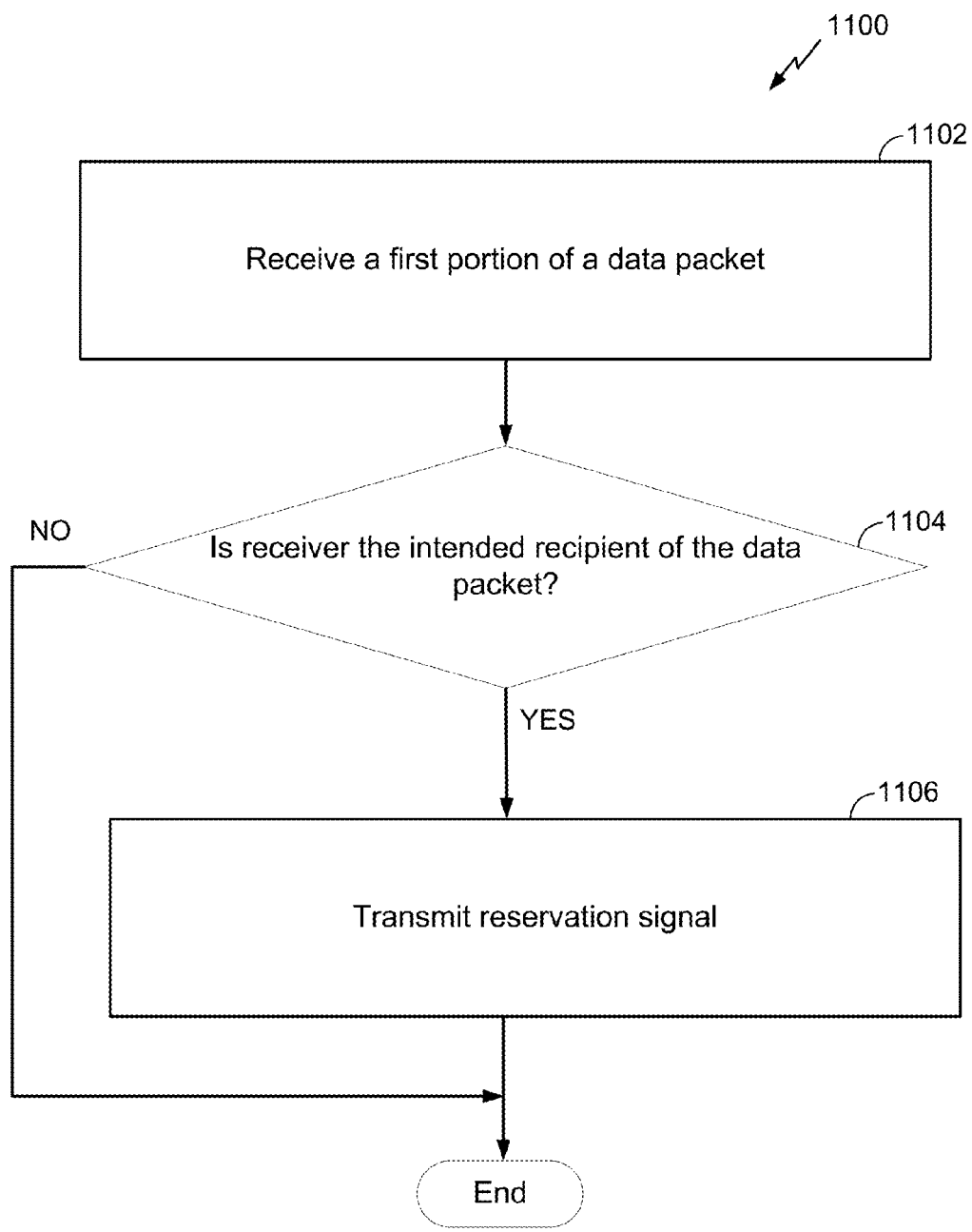
FIG. 11 illustrates an aspect of a method for receiving data in a wireless network using receiver based CCA.

FIG. 11 illustrates an aspect of a method 1100 for receiving data in a wireless network using receiver based CCA. At a block 1102, the wireless device 202r receives a first portion of the data packet from the wireless device 202t. At a block 1104, the wireless device 202r determines if it is the intended recipient for the data packet. If at the block 1104, the wireless device 202r determines it is not the intended recipient, the method 1100 ends. If at the block 1104, the wireless device 202r determines it is the intended recipient, the method 1100 continues to a block 1106. At the block 1106, the wireless device 202r transmits a reservation signal as discussed above to reserve a communications channel for receiving the data packet from the wireless device 202t.

Figure 12:
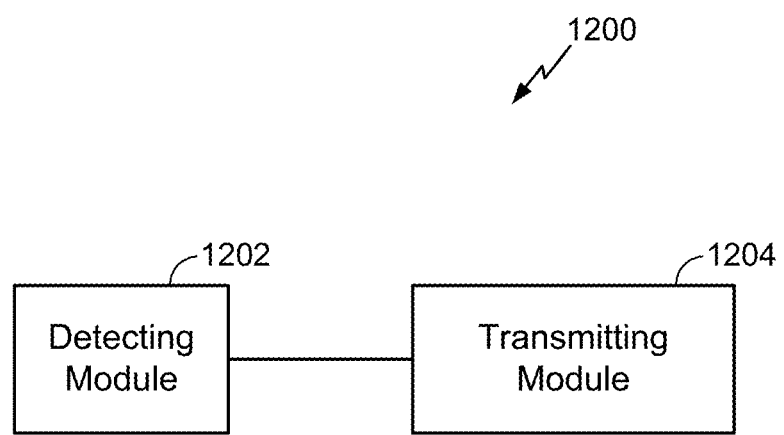
FIG. 12 is a functional block diagram of another exemplary wireless device that may be employed within the wireless communication system of FIG. 1.

FIG. 12 is a functional block diagram of another exemplary wireless device 1200 that may be employed within the wireless communication system 100. The device 1200 comprises a detecting module 1202 for detecting a reservation signal. The detecting module 1202 may be configured to perform one or more of the functions discussed above with respect to the blocks 1002, 1004, and 1006 illustrated in FIG. 10. The detecting module 1202 may correspond to one or more of the processor 204 and the DSP 220. The device 1200 further comprises a transmitting module 1204 for transmitting a data packet. The transmitting module 1204 may be configured to perform one or more of the functions discussed above with respect to the block 1008 illustrated in FIG. 10. The transmitting module 1204 may correspond to the transmitter 210.

Figure 13:
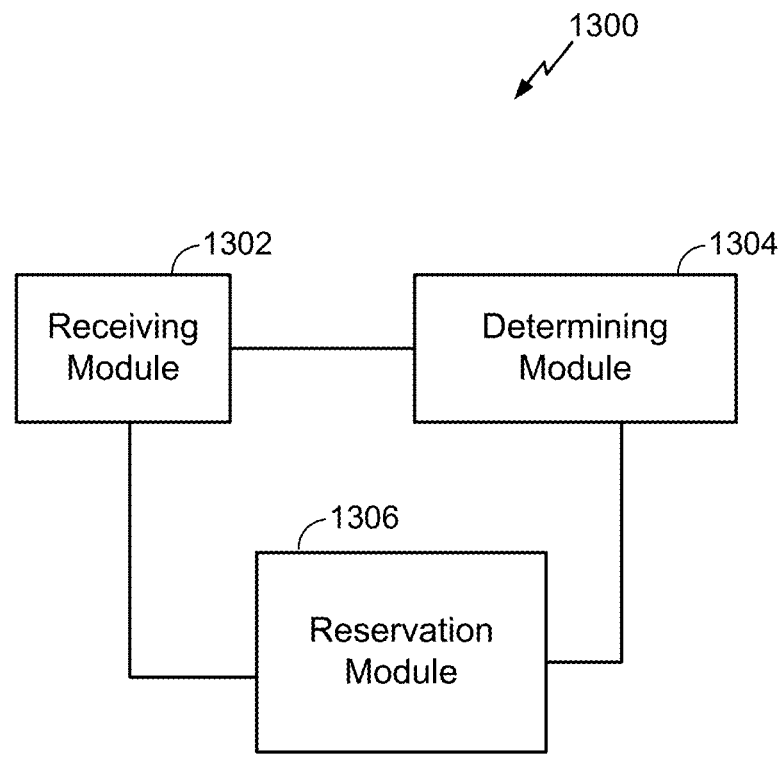
FIG. 13 is a functional block diagram of another exemplary wireless device that may be employed within the wireless communication system of FIG. 1.

FIG. 13 is a functional block diagram of another exemplary wireless device 1300 that may be employed within the wireless communication system 130. The device 1300 comprises a receiving module 1302 for wirelessly receiving a wireless communication comprising the packet. The receiving module 1302 may be configured to perform one or more of the functions discussed above with respect to the block 1102 illustrated in FIG. 11. The receiving module 1302 may correspond to the receiver 212. The device 1300 further comprises a determining module 1304 for determining if the device 1300 is the intended recipient of the packet. The determining module 1304 may be configured to perform one or more of the functions discussed above with respect to the block 1104 illustrated in FIG. 11. The determining module 1304 may correspond to one or more of the processor 204, the signal detector 218, and the DSP 220. The device 1300 further comprises a reservation module 1306 for generating and transmitting a reservation signal. The reservation module 1306 may be configured to perform one or more of the functions discussed above with respect to the block 1106 illustrated in FIG. 11. The reservation module 1306 may correspond to one or more of the processor 204, the transmitter 210, and the DSP 220.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of communicating in a wireless network, the method comprising:
   receiving a first portion of a data packet at a wireless device;
   determining, at the wireless device, that the wireless device is the intended receiver of the data packet; and
   transmitting from the wireless device a reservation signal, configured to reserve a communication channel for the wireless device to receive the data packet, the transmitting based on the determining the wireless device is the intended receiver, the reservation signal transmitted from the wireless device after receiving the first portion of the data packet and while the wireless device receives a second portion of the data packet.

2. The method of claim 1, wherein the reservation signal is transmitted on a dedicated channel that is different than the communication channel, the dedicated channel being associated with the communication channel.

3. The method of claim 1, wherein the reservation signal is transmitted on the communication channel.

4. The method of claim 3, wherein the reservation signal comprises a series of beeps of a first fixed time period separated by a beep interval that comprises a second fixed time period that is longer than the first fixed time period.

5. The method of claim 4, wherein each beep of the series of beeps comprises a short-training-field signal.

6. The method of claim 1, wherein the reservation signal is configured to reserve the communication channel for a fixed period of time.

7. The method of claim 6, further comprising receiving the data packet during the fixed time period.

8. An apparatus for communicating in a wireless network, the apparatus comprising:
   a receiver configured to receive a first portion of a data packet;
   a processor configured to determine that the apparatus is the intended receiver of the data packet; and
   a transmitter configured to transmit a reservation signal configured to reserve a communication channel for the apparatus to receive the data packet, the transmitter configured to transmit based on the determining the apparatus is the intended receiver, the transmitter configured to transmit the reservation signal after receiving the first portion of the data packet and while the receiver receives a second portion of the data packet.

9. The apparatus of claim 8, wherein the reservation signal is transmitted on a dedicated channel that is different than the communication channel, the dedicated channel being associated with the communication channel.

10. The apparatus of claim 8, wherein the reservation signal is transmitted on the communication channel.

11. The apparatus of claim 10, wherein the reservation signal comprises a series of beeps of a first fixed time period separated by a beep interval that comprises a second fixed time period that is longer than the first fixed time period.

12. The apparatus of claim 11, wherein each beep of the series of beeps comprises a short-training-field signal.

13. The apparatus of claim 8, wherein the reservation signal is configured to reserve the communication channel for a fixed period of time.

14. The apparatus of claim 13, wherein the receiver is further configured to receive the data packet during the fixed time period.

15. An apparatus for communicating in a wireless network, the apparatus comprising:
   means for receiving a first portion of a data packet at the apparatus;
   means for determining at the apparatus that the apparatus is the intended receiver of the data packet; and
   means for transmitting a reservation signal configured to reserve a communication channel for the apparatus to receive the data packet based on determining that the apparatus is the intended receiver, the reservation signal transmitted after receiving the first portion of the data packet and while receiving a second portion of the data packet at the apparatus.

16. The apparatus of claim 15, wherein the reservation signal is transmitted on a dedicated channel that is different than the communication channel, the dedicated channel being associated with the communication channel.

17. The apparatus of claim 15, wherein the reservation signal is transmitted on the communication channel.

18. The apparatus of claim 17, wherein the reservation signal comprises a series of beeps of a first fixed time period separated by a beep interval that comprises a second fixed time period that is longer than the first fixed time period.

19. The apparatus of claim 18, wherein each beep of the series of beeps comprises a short-training-field signal.

20. The apparatus of claim 15, wherein the reservation signal is configured to reserve the communication channel for a fixed period of time.

21. The apparatus of claim 20, further comprising means for receiving the data packet during the fixed time period.

22. A non-transitory computer readable storage medium comprising instructions that when executed cause an apparatus to:
   receive a first portion of a data packet at the apparatus;
   determine, at the apparatus, that the apparatus is the intended receiver of the data packet; and
   transmit, from the apparatus, a reservation signal configured to reserve a communication channel for the wireless device to receive the data packet based on the determination that the apparatus is the intended receiver, the reservation signal transmitted after receiving the first portion of the data packet and while a second portion of the data packet is received at the apparatus.

23. The computer readable medium of claim 22, wherein the reservation signal is transmitted on a dedicated channel that is different than the communication channel, the dedicated channel being associated with the communication channel.

24. The computer readable medium of claim 22, wherein the reservation signal is transmitted on the communication channel.

25. The computer readable medium of claim 24, wherein the reservation signal comprises a series of beeps of a first fixed time period separated by a beep interval that comprises a second fixed time period that is longer than the first fixed time period.

26. The computer readable medium of claim 25, wherein each beep of the series of beeps comprises a short-training-field signal.

27. The computer readable medium of claim 22, wherein the reservation signal is configured to reserve the communication channel for a fixed period of time.

28. The computer readable medium of claim 27, further comprising instructions that when executed cause the apparatus to receive the data packet during the fixed time period.

\* \* \* \* \*